(12) United States Patent
Yazaki et al.

(10) Patent No.: US 11,634,997 B2
(45) Date of Patent: Apr. 25, 2023

(54) COMBINED POWER SYSTEM

(71) Applicant: HONDA MOTOR CO., LTD., Tokyo (JP)

(72) Inventors: Manabu Yazaki, Wako (JP); Tatsuya Choji, Wako (JP); Naoki Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/708,034

(22) Filed: Mar. 30, 2022

(65) Prior Publication Data

US 2022/0316354 A1 Oct. 6, 2022

(30) Foreign Application Priority Data

Mar. 31, 2021 (JP) ............................. JP2021-062217

(51) Int. Cl.

| | |
|---|---|
| *F01D 15/10* | (2006.01) |
| *H02K 7/18* | (2006.01) |
| *H02K 7/14* | (2006.01) |
| *H02K 7/00* | (2006.01) |
| *F01D 25/24* | (2006.01) |

(52) U.S. Cl.
CPC ............ *F01D 15/10* (2013.01); *F01D 25/24* (2013.01); *H02K 7/003* (2013.01); *H02K 7/14* (2013.01); *H02K 7/1823* (2013.01); *F05D 2220/766* (2013.01); *F05D 2240/14* (2013.01); *F05D 2240/60* (2013.01); *F05D 2250/62* (2013.01); *F05D 2260/31* (2013.01)

(58) Field of Classification Search
CPC .......... F01D 15/10; F01D 25/24; F01D 25/16; H02K 7/003; H02K 7/14; H02K 7/1823; H02K 5/1732; H02K 5/203; H02K 9/06; H02K 9/08; H02K 11/21; F05D 2220/766; F05D 2240/14; F05D 2240/60; F05D 2250/62; F05D 2260/31
See application file for complete search history.

(56) References Cited

U.S. PATENT DOCUMENTS

| | | | | |
|---|---|---|---|---|
| 2004/0016239 | A1* | 1/2004 | Fabian | B33Y 70/00 60/805 |
| 2011/0049891 | A1* | 3/2011 | Bedrine | F01D 15/10 290/46 |
| 2014/0125066 | A1* | 5/2014 | Baumgart | F01D 25/22 290/1 A |
| 2019/0288576 | A1* | 9/2019 | Oshita | H02K 5/203 |
| 2022/0082050 | A1* | 3/2022 | Auker | H02K 5/207 |

FOREIGN PATENT DOCUMENTS

| | | |
|---|---|---|
| JP | 2002-147250 | 5/2002 |
| JP | 2003-120210 | 4/2003 |

\* cited by examiner

*Primary Examiner* — Joseph Ortega
(74) *Attorney, Agent, or Firm* — Amin, Turocy & Watson, LLP

(57) ABSTRACT

An engine housing of a gas turbine engine includes a plurality of leg members. An air intake space is formed between the plurality of leg members. A shroud case supported by the engine housing is disposed in the air intake space. A rotary electric machine housing of a rotary electric machine system includes a rectifying member. The rectifying member includes a distal end facing toward the shroud case, and the distal end is inserted inside the shroud case.

4 Claims, 9 Drawing Sheets

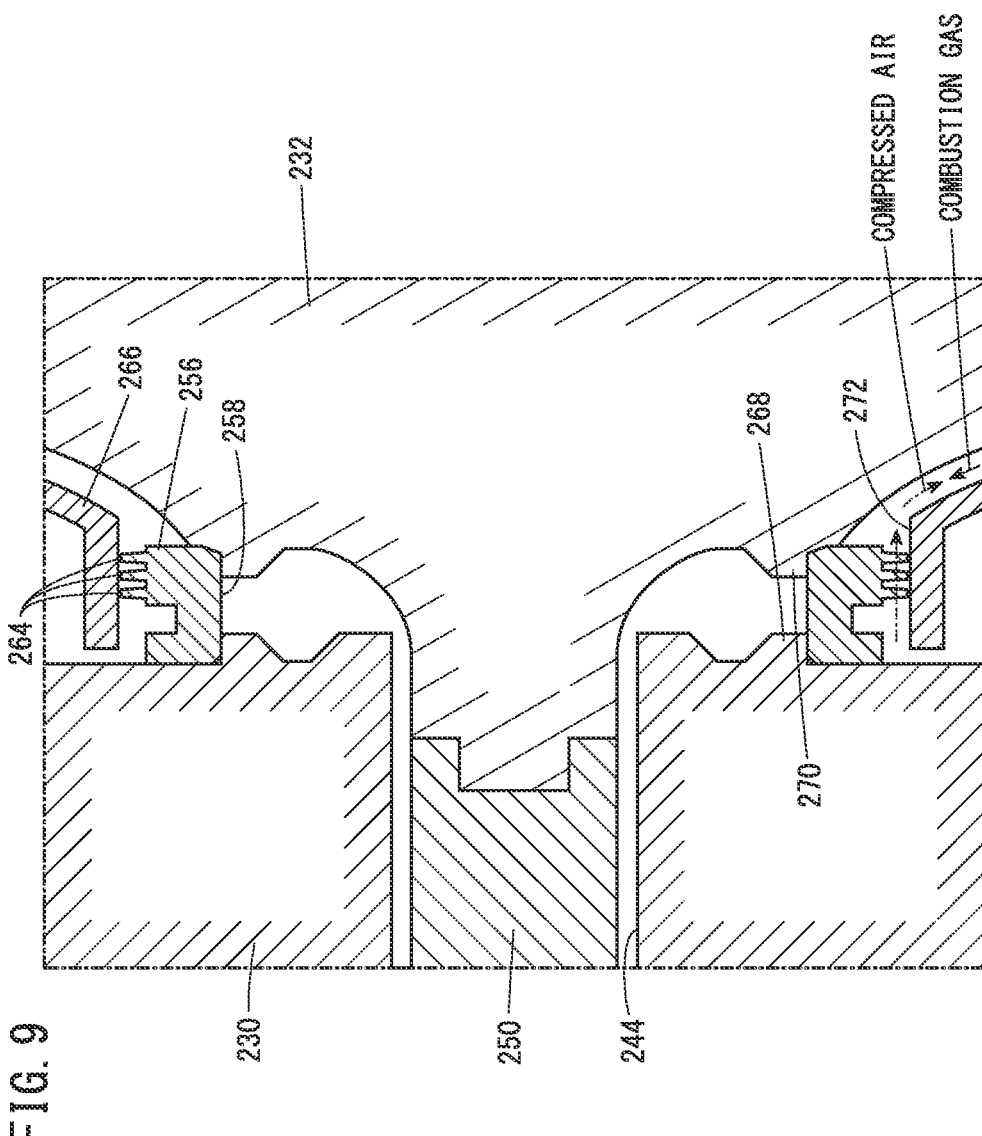

COMBINED POWER SYSTEM

CROSS-REFERENCE TO RELATED APPLICATIONS

This application is based upon and claims the benefit of priority from Japanese Patent Application No. 2021-062217 filed on Mar. 31, 2021, the contents of which are incorporated herein by reference.

BACKGROUND OF THE INVENTION

Field of the Invention

The present invention relates to a combined power system integrally constituted by a rotary electric machine system and a gas turbine engine.

Description of the Related Art

In JP 2002-147250 A and JP 2003-120210 A (FIG. 2), a combined power system is disclosed in which a rotary electric machine and a gas turbine engine, which is one type of internal combustion engine, are combined together and integrated. In this case, a rotating shaft of the rotor constituting the rotary electric machine and an output shaft of the gas turbine engine are connected on the same axial line, and both shafts thereof rotate together integrally. In recent years, attempts are made to mount the combined power system configured as above, together with a battery, for example, on a flying object such as a multicopter or the like.

SUMMARY OF THE INVENTION

As is widely known, in a gas turbine engine, atmospheric air is taken into an engine housing. The combined power system described in JP 2002-147250 A draws atmospheric air thereinto from an intake duct disposed at an end of an electrical power generator casing (rotary electric machine housing) disposed on a side away from a gas turbine engine. On an outer circumferential side of the electrical power generator casing, an intake housing is provided. Atmospheric air drawn into from the intake duct flows into inside of the engine housing through the intake housing. In this case, the intake duct extends toward outside of the electrical power generator casing in a diametrical direction, and the intake housing is provided on the outer circumferential side of the electrical power generator casing. Thus, the entire casing that accommodates a rotary electric machine becomes considerably greater.

Incidentally, in a small flying object, in particular, a space for mounting some equipment or facilities is limited. Therefore, when a combined power system is large as described in JP 2002-147250 A, it causes a defect such that the freedom in the arrangement layout of equipment is lowered.

In a combined power system described in JP 2003-120210 A, an air intake port is provided between a wall end surface at an end of an electrical power generator casing in an axial direction, and a shroud case disposed on an end of a heat exchanger housing (engine housing) facing toward a rotary electric machine. According to this configuration, it is expected that the electrical power generator casing need not have the intake duct or the intake housing. In the configuration described in JP 2003-120210 A, however, it is not easy to draw therein atmospheric air in the vicinity of the shroud case efficiently.

A principal object of the present invention is to provide a combined power system the size and scale of which can be reduced.

Another object of the present invention is to provide a combined power system that is capable of drawing atmospheric air therein efficiently.

According to an aspect of the present invention, a combined power system is provided. The combined power system includes:

a rotary electric machine system including a rotary electric machine, and a rotary electric machine housing in which a rotating shaft of the rotary electric machine is rotatably supported; and a gas turbine engine including an output shaft configured to support a turbine wheel and a compressor wheel and rotate integrally with the rotating shaft, and an engine housing in which the turbine wheel and the compressor wheel are accommodated, wherein the engine housing includes a plurality of leg members on one end thereof in an axial direction, the plurality of leg members are connected to one end of the rotary electric machine housing in an axial direction, and an air intake space is formed between the plurality of leg members, the combined power system further includes:

a rectifying member provided on the one end of the rotary electric machine housing in the axial direction, and disposed in the air intake space, the rectifying member being gradually reduced in diameter from the rotary electric machine toward the gas turbine engine; and a shroud case supported by the engine housing and disposed in the air intake space, the shroud case facing toward the rectifying member, and the rectifying member includes a distal end facing toward the shroud case, and the distal end is inserted inside the shroud case.

According to the present invention, the rectifying member is disposed in the vicinity of the shroud case. Further, the distal end of the rectifying member is inserted inside the shroud case. Thus, atmospheric air in the vicinity of the shroud case flows toward the shroud case under the rectifying action of the rectifying member. Stated otherwise, it is easy to collect atmospheric air in the shroud case. As a result, atmospheric air is drawn in the shroud case efficiently, and is taken into inside of the engine housing.

According to this configuration, moreover, it is not necessary for the rotary electric machine housing to include an intake duct and an intake housing. Consequently, it is possible to reduce the size and scale of the combined power system.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is an enlarged view of principal components shown in FIG. 8.

DESCRIPTION OF THE INVENTION

A preferred embodiment of a combined power system according to the present invention will be presented and described in detail below with reference to the accompanying drawings. In should be noted that, in the following description, although the terms "left," "right," "down," and "up" designate the leftward, rightward, downward, and upward directions shown in FIGS. 3 to 5, 8 and 9, such a designation is merely for the sake of convenience in order to facilitate understanding, and the posture when the combined power system is actually placed in use is not limited.

Figure 1:
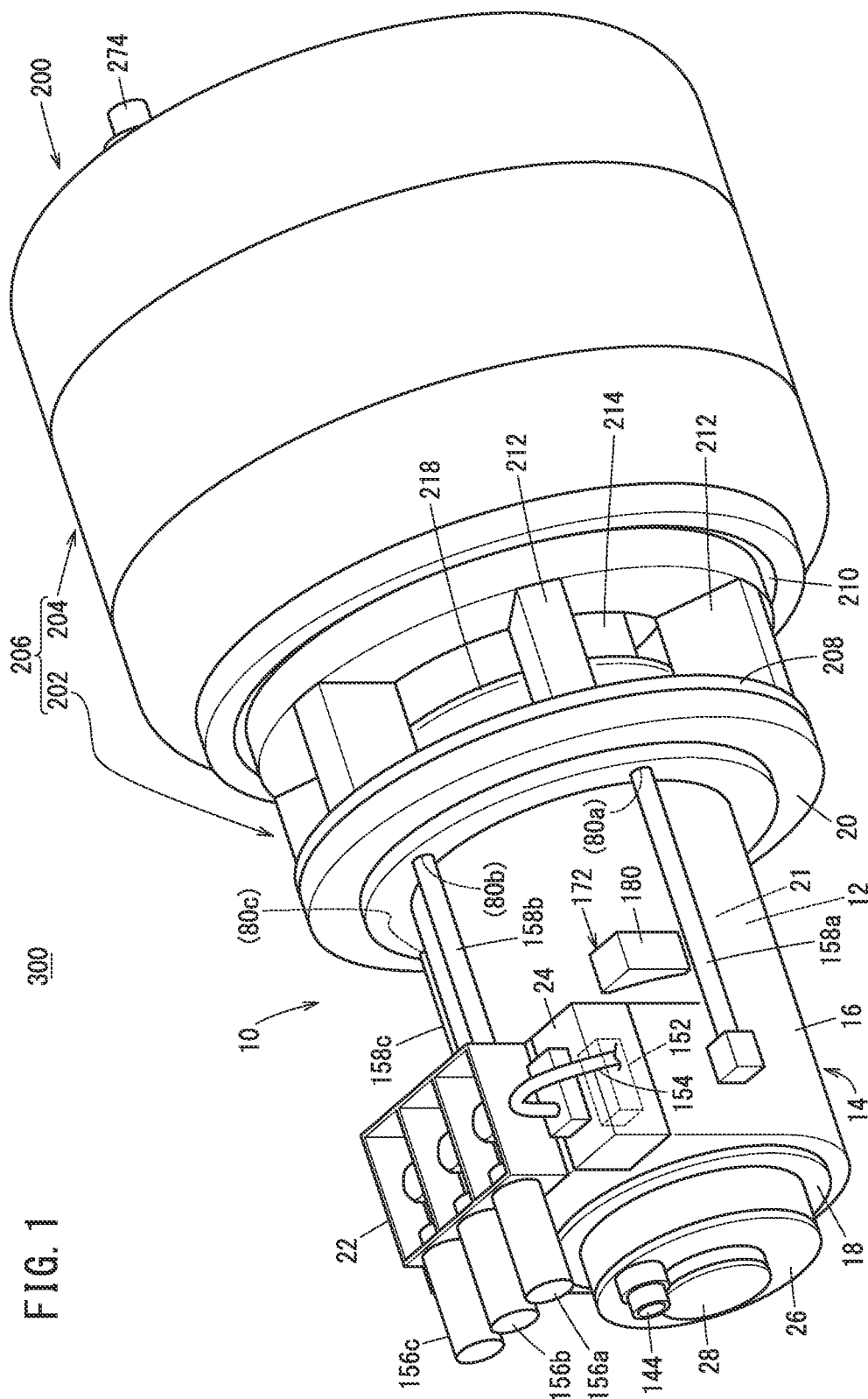
FIG. 1 is a schematic overall perspective view of a combined power system according to an embodiment of the present invention.

FIG. 1 is a schematic overall perspective view of a combined power system 300 according to an embodiment of the present invention. The combined power system 300 comprises a rotary electric machine system 10 and a gas turbine engine 200 which is an internal combustion engine. The gas turbine engine 200 is disposed on a right side in an axial direction of the rotary electric machine system 10. Further, an axis that extends along a longitudinal direction (axial direction) and passes through a diametrical center of the rotary electric machine system 10, and an axis that extends along a longitudinal direction (axial direction) and passes through a diametrical center of the gas turbine engine 200 coincide with each other.

Stated otherwise, the rotary electric machine system 10 and the gas turbine engine 200 are arranged in parallel on the same axis. The combined power system 300 which is configured in such a manner can be used, for example, as a power source for propulsion in a flying object such as a drone, or in a ship, an automobile, or the like. Alternatively, the combined power system 300 can be used as a power source for an auxiliary power source in an aircraft, a ship, a building, or the like. When mounted on a flying body such as a multicopter or the like, the combined power system 300 functions as a power drive source to rotationally energize a motor constituting a lift generating device such as a prop, a ducted fan, or the like. Further, when mounted on a ship, the combined power system 300 functions as a rotational force generating device for a screw, and when mounted on an automobile, the combined power system 300 functions as a power drive source for rotationally urging a motor that constitutes an engine. In addition, the combined power system 300 can be applied to gas turbine electrical power generating facilities. Moreover, in the present embodiment, as will be described later, the gas turbine engine 200 serves in a dual manner as a gas supply source for supplying compressed air (gas).

Figure 2:
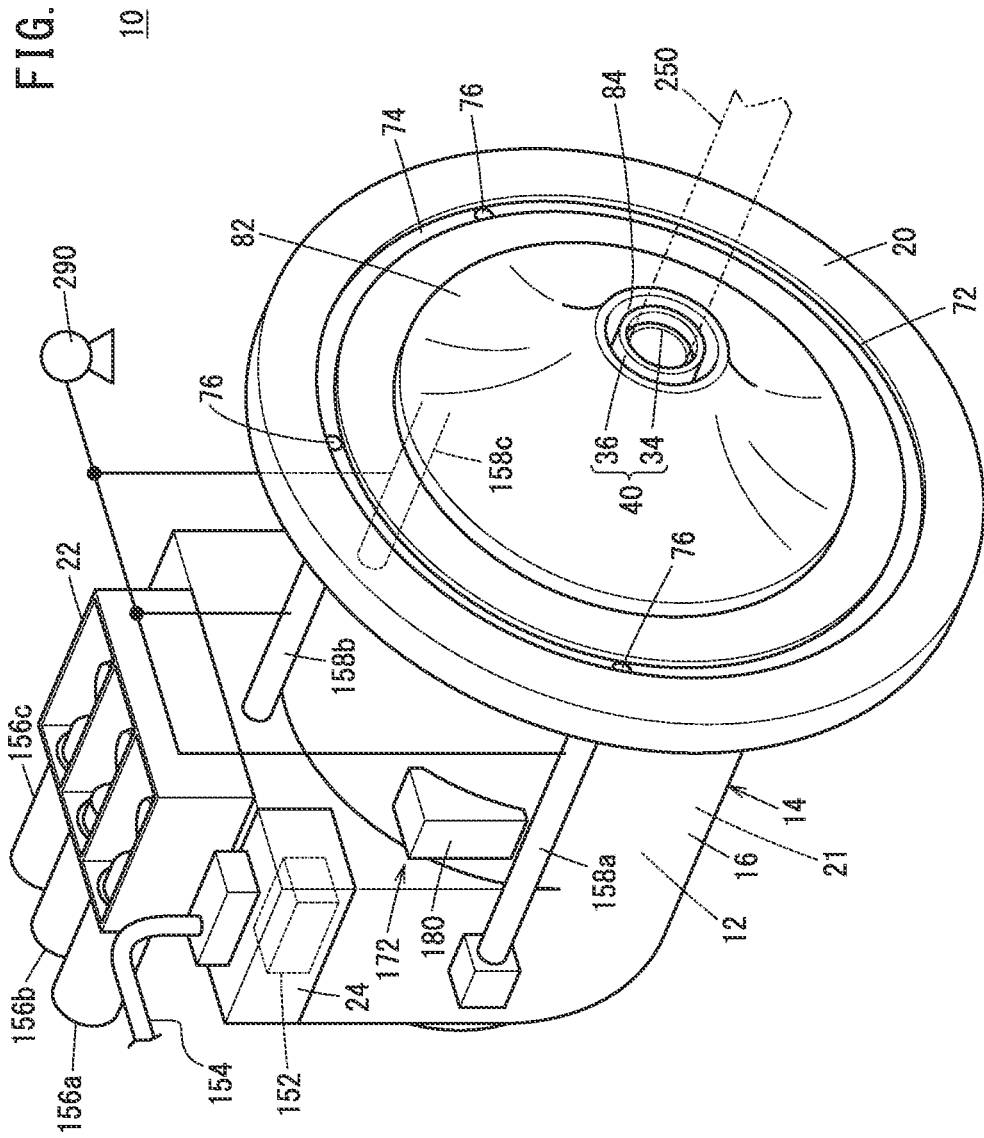
FIG. 2 is a schematic overall perspective view of a rotary electric machine system constituting part of the combined power system.
Figure 3:
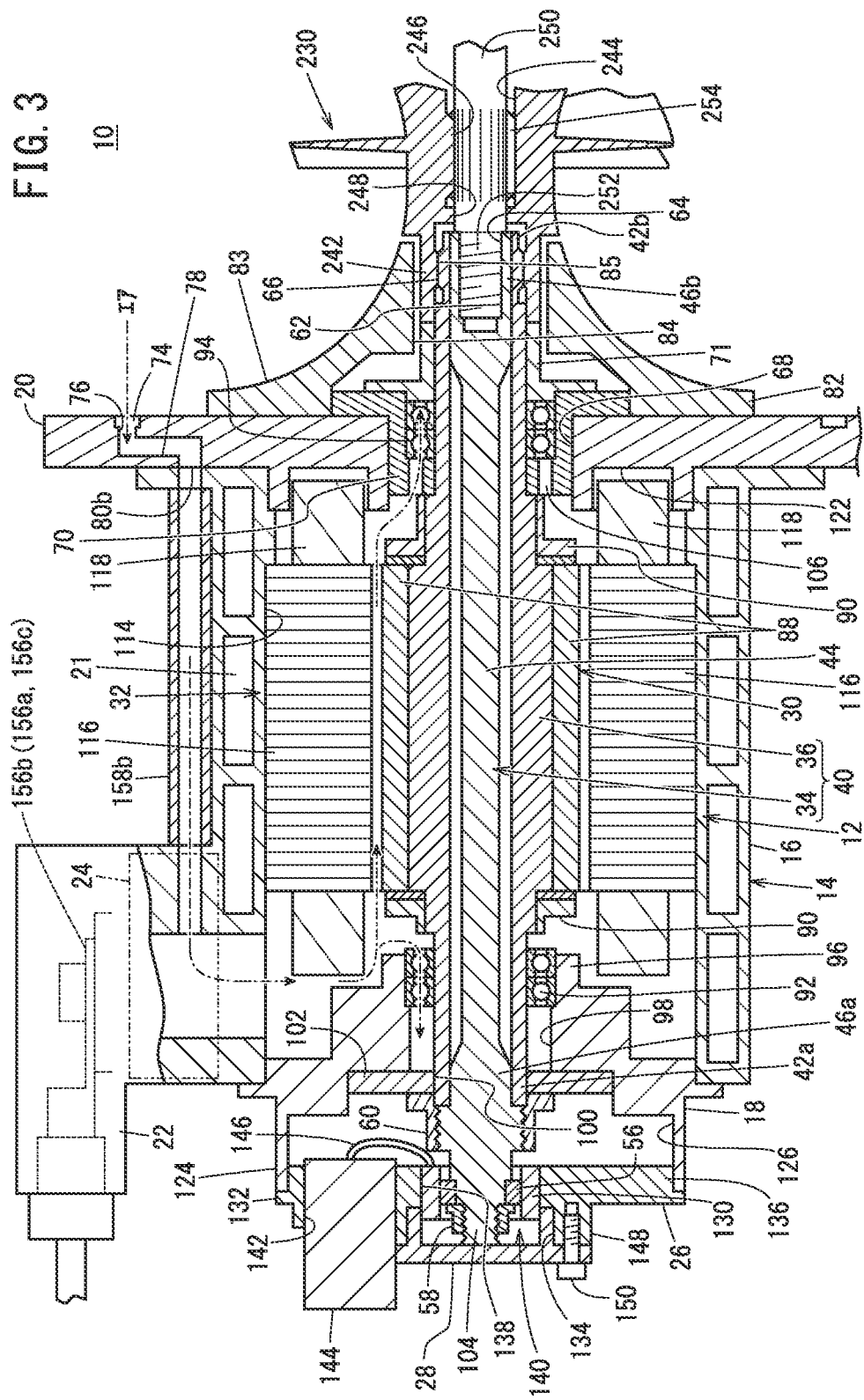
FIG. 3 is a schematic side cross-sectional view of the rotary electric machine system.

First, a description will be given concerning the rotary electric machine system 10. FIG. 2 and FIG. 3 are, respectively, a schematic overall perspective view and a schematic side cross-sectional view of the rotary electric machine system 10. The rotary electric machine system 10 comprises a rotary electric machine 12 (for example, an electrical power generator) and a rotary electric machine housing 14 in which the rotary electric machine 12 is accommodated. The rotary electric machine housing 14 exhibits a substantially cylindrical shape, and includes a main housing 16 that has open ends on both the left and right ends thereof, a first sub-housing 18 connected to the left end of the main housing 16, and a second sub-housing 20 connected to the right end of the main housing 16.

The main housing 16 has a substantially cylindrical shape in which a thick side wall extends along a lateral (left-right) direction. A cooling jacket 21 through which a cooling medium flows is formed in the inner portion of the side wall. As a specific example of the cooling medium, there may be cited cooling water, and in this case, the cooling jacket 21 is a water jacket. Further, on an outer surface (an outer side wall) of the side wall of the main housing 16, in the vicinity of a left end thereof, a terminal casing 22 and a measuring device casing 24 are disposed integrally with the main housing 16.

Furthermore, on an outer side wall of the main housing 16, there are provided hollow pipe members 158a to 158c that extend along a longitudinal direction (the left-right direction in FIG. 3) of the main housing 16. The hollow interior parts of the hollow pipe members 158a to 158c are compressed air flow passages through which a curtain air flows. Further, a detector retaining member that retains the rotation parameter detector is connected to the first sub-housing 18. According to the present embodiment, the rotation parameter detector is exemplified by a resolver 14C. Accordingly, hereinafter, the detector holding member that is connected to the first sub-housing 18 will be referred to as a "resolver holder 26". A cap cover 28 is screw-engaged with the resolver holder 26. Concerning the above-described elements, a detailed description thereof will be provided later.

The rotary electric machine 12 includes a rotor 30, and a stator 32 that surrounds an outer circumferential side of the rotor 30.

The rotor 30 includes a rotating shaft 40 configured such that an inner side shaft 34 is capable of being removably inserted into a hollow cylindrical outer side shaft 36. More specifically, the outer side shaft 36 is a hollow body having a substantially cylindrical shape, and both ends of which are open ends. That is, the outer side shaft 36 includes a left opening end 42a (see FIG. 4) and a right opening end 42b (see FIG. 5).

On the other hand, the inner side shaft 34 is longer in length than the outer side shaft 36. The inner side shaft 34 includes a cylindrical column portion 44 a diameter of which is minimal, a left end part 46a (see FIG. 4) which is connected to a left side of the cylindrical column portion 44 and a diameter of which is larger in comparison with the cylindrical column portion 44, and a right end part 46b (see FIG. 5) which is connected to the right side of the cylindrical column portion 44 and a diameter of which is larger in comparison with the cylindrical column portion 44 and smaller in comparison with the left end part 46a. Among these elements, one portion of the left end part 46a projects out and is exposed from the left opening end 42a of the outer side shaft 36, and becomes a protruding distal end 104 to be described later. Moreover, although in the illustrated example, the right end part 46b and the right opening end 42b of the outer side shaft 36 are flush with each other, the right end part 46b may be at a position that is slightly recessed from the right opening end 42b.

Figure 4:
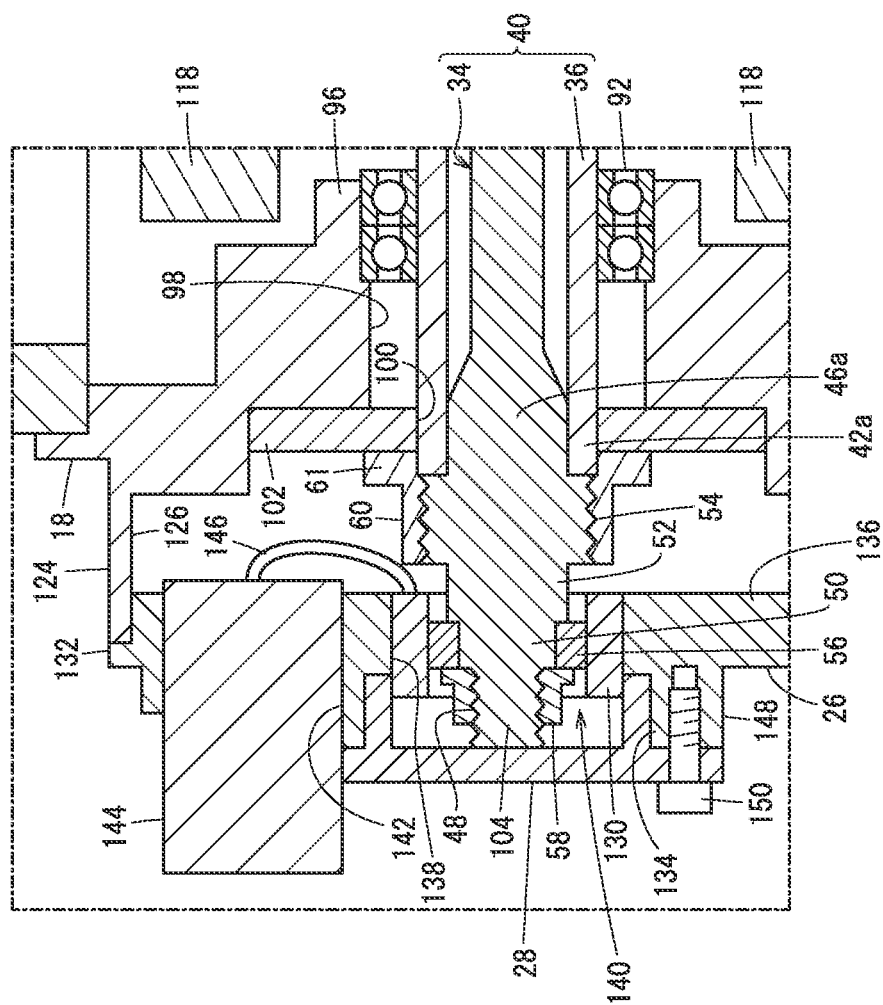
FIG. 4 is an enlarged view of principal components shown in FIG. 3.

As shown in detail in FIG. 4, on the left end part 46a of the inner side shaft 34, there are provided in this order from the left toward the right a first external threaded portion 48, a flange portion 50, a stopper portion 52, and a second external threaded portion 54. The outer diameters of the first external threaded portion 48, the flange portion 50, the stopper portion 52, and the second external threaded portion 54 become larger in this order. The outer diameter of the second external threaded portion 54 is set to be larger than the inner diameter of the outer side shaft 36, and therefore, the right end of the second external threaded portion 54 is held back by the edge of the left opening end 42a of the outer side shaft 36. Consequently, part of the inner side shaft 34 on a leftward side of the second external threaded portion 54 is prevented from being inserted inside the outer side shaft 36.

A resolver rotor 56 is mounted on the flange portion 50, together with a small cap nut 58 being screwed-engaged with the first external threaded portion 48. The resolver rotor 56 is positioned and fixed to the flange portion 50 by the right end thereof end being held back by the stopper portion 52, together with the left end being pressed by the small cap nut 58. Further, a large cap nut 60 is screwed-engaged with the second external threaded portion 54. A skirt portion 61 of the large cap nut 60 covers the outer circumferential wall of the left opening end 42a of the outer side shaft 36. Consequently, the left end part 46a of the inner side shaft 34 is constrained by the left opening end 42a of the outer side shaft 36. Both the first external threaded portion 48 and the second external threaded portion 54 are so-called reverse threads. Accordingly, the small cap nut 58 and the large cap nut 60 are rotated counterclockwise at a time of being screw-engaged. Further, by portions of the threads of the small cap nut 58 and the large cap nut 60 being deformed, it is possible to prevent the small cap nut 58 and the large cap nut 60 from being loosened any more than at the time of screw-engagement thereof.

Figure 5:
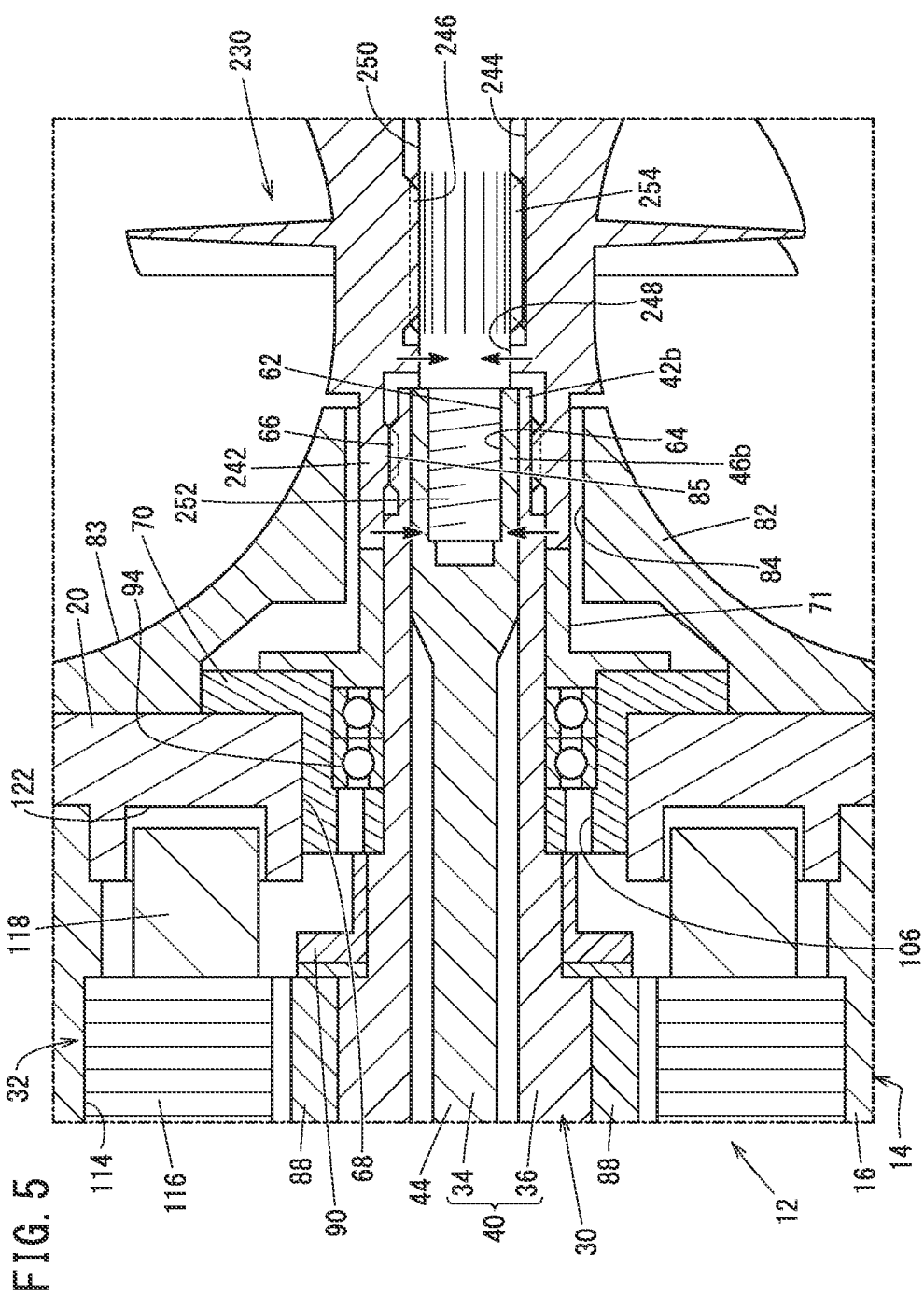
FIG. 5 is an enlarged view of principal components shown in FIG. 3, at a location that differs from that shown in FIG. 4.

As shown in FIG. 5, a shaft connecting hole 62 is formed in the right end part 46b of the inner side shaft 34 in a manner so as to extend toward a left end part 46a side. A female threaded portion 64 is engraved on an inner circumferential wall of the shaft connecting hole 62. Further, a first inner circumferential side spline 66 (inner circumferential side engaging portion) that extends along the left-right direction is formed on an outer circumferential wall of the right opening end 42b of the outer side shaft 36.

The second sub-housing 20, which exhibits a substantially disk shape, is connected via non-illustrated bolts to the main housing 16. A center of the second sub-housing 20 forms a thick-walled cylindrical portion, and a large-diameter insertion hole 68 is formed in such a cylindrical portion. A second bearing 94 (described later) is inserted into the insertion hole 68. The second bearing 94 is sandwiched between and is positioned and fixed by an inner stopper 70 and an outer stopper 71.

As shown in FIG. 2, an annular recessed portion 72 is formed in an end surface of the second sub-housing 20 in facing relation to the gas turbine engine 200, together with an annular collection flow path 74 being formed in the annular recessed portion 72. As will be described later, a portion of the compressed air generated by the gas turbine engine 200 is diverted into and flows through the collection flow path 74. Upstream side communication holes 76 are formed at three locations on a bottom wall of the annular recessed portion 72.

Figure 6:
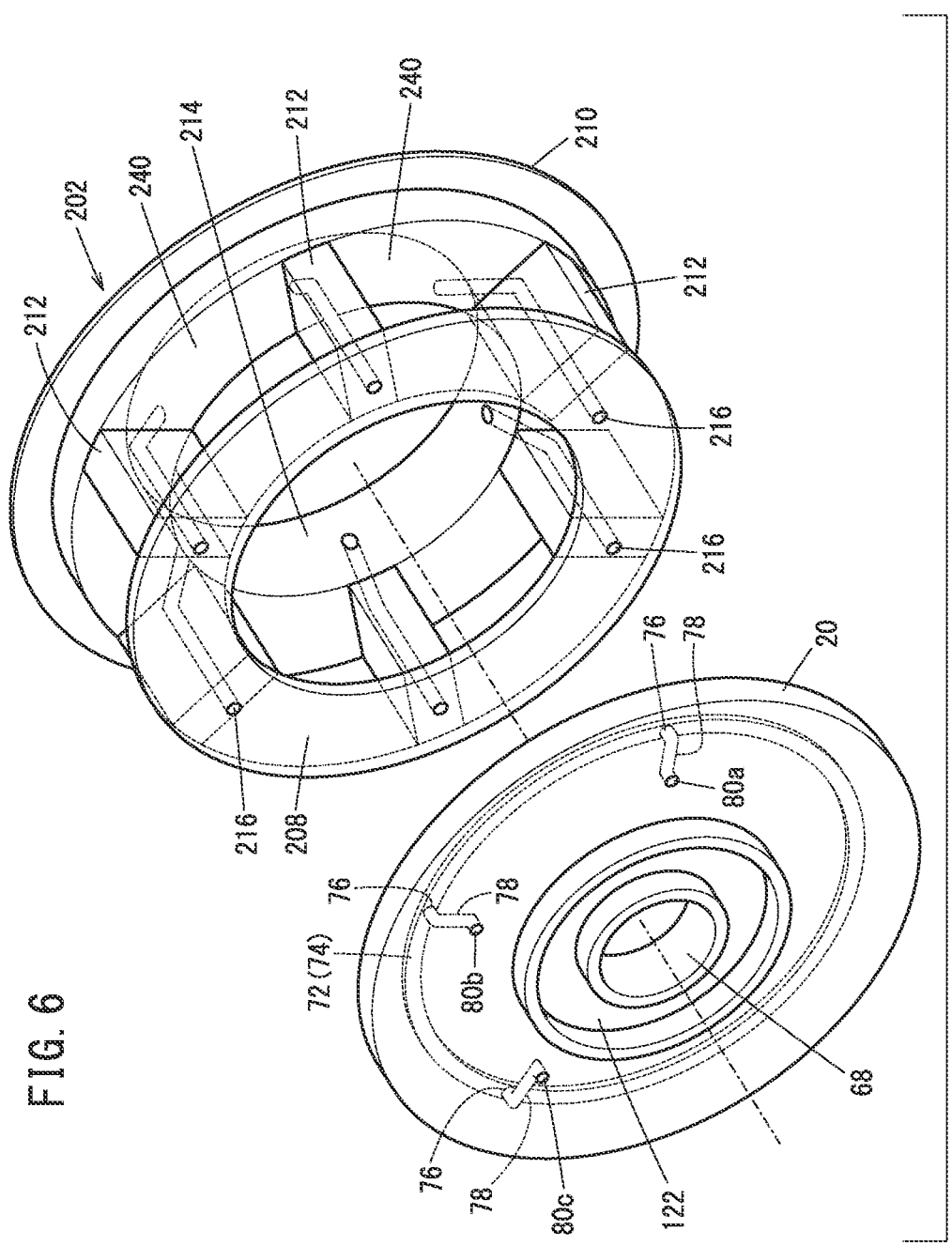
FIG. 6 is a schematic perspective view of a second sub-housing constituting a rotary electric machine housing, and an inner housing constituting an engine housing.

Further, as shown in FIG. 6, relay communication passages 78 are provided in an interior part of the second sub-housing 20. The relay communication passages 78 extend in a radial form along a diametrical direction of the second sub-housing 20, together with communicating in a diametrically outward direction with the collection flow path 74 via the upstream side communication holes 76 externally in the diametrical direction. Furthermore, three downstream side communication holes 80a to 80c are formed on an end surface of the second sub-housing 20 in facing relation to the rotary electric machine 12. The downstream side communication holes 80a to 80c are downstream side openings of the relay communication passages 78. The three downstream side communication holes 80a to 80c individually open into each of the hollow pipe members 158a to 158c. As can be understood from such a configuration, the relay communication passages 78 place the collection flow path 74 in communication with the hollow interior parts (compressed air flow passages) of the hollow pipe members 158a to 158c. A distribution passage is formed by the collection flow path 74 and the relay communication passages 78.

As shown in FIG. 5, a rectifying member 82 is provided on an end surface (on one end part in the axial direction) of the second sub-housing 20 on a side facing toward the gas turbine engine 200, in a manner so as to project toward a gas turbine engine 200 side. The rectifying member 82 is made up from a chevron shaped body or a bottomless cup-shaped body, in which a base portion thereof facing toward a side of the second sub-housing 20 is formed in a large diameter and thin-walled annular shape, and a top portion thereof facing toward the gas turbine engine 200 is formed in a small diameter and thick-walled annular shape. In addition, a side circumferential wall 83 between the base portion and the top portion is a smooth surface with a small amount of surface roughness.

Further, a diameter (opening diameter) of a through hole 84 on a top portion side is set to be greater than an outer diameter of the outer stopper 71. Therefore, a right end of the outer stopper 71 which has entered into the through hole 84 does not interfere with an inner wall of the through hole 84. Stated otherwise, a gap is formed between an outer circumferential wall of the outer stopper 71 and the inner wall of the through hole 84.

A left end of an output shaft 250 is inserted into the shaft connecting hole 62 that is formed in the inner side shaft 34. The output shaft 250 is coupled to the inner side shaft 34 by means of screw-engagement, as will be described later. Moreover, the output shaft 250 supports a compressor wheel 230 and a turbine wheel 232 that constitute the gas turbine engine 200 (see FIG. 8).

As shown in FIG. 3, an outer diameter of a substantially intermediate portion in a longitudinal direction of the outer side shaft 36 is set to be a maximum diameter, and a plurality of permanent magnets 88 are retained by a magnet holder 90 on such a large diameter portion. The adjacent permanent magnets 88 themselves are arranged adjacent to each other, and the adjacent magnets have polarities different from each other facing toward the outer circumferential side. Accompanying rotation of the rotating shaft 40, the individual permanent magnets 88 revolve about a center of rotation of the rotating shaft 40.

A left end (first end part) of the rotating shaft 40 is rotatably supported in the first sub-housing 18 via a first bearing 92. Further, a right end (second end part) of the rotating shaft 40 is rotatably supported in the second sub-housing 20 via the second bearing 94. In this instance, as shown in FIG. 3, according to the present embodiment, the first bearing 92 is interposed between the outer side shaft 36 and the first sub-housing 18. Further, the second bearing 94 is interposed via the inner stopper 70 between the outer side shaft 36 and the second sub-housing 20.

More specifically, the first sub-housing 18 includes a columnar protrusion 96 that protrudes toward the main housing 16 and exhibits a substantially cylindrical shape, and a first shaft insertion hole 98 is formed in such a columnar protrusion 96. The first bearing 92 is disposed inside the first shaft insertion hole 98.

A leftward opening of the first shaft insertion hole 98 is closed by a disk-shaped member 102 in which a second shaft insertion hole 100 connected to the first shaft insertion hole 98 is formed. Although detailed illustration thereof is omitted, an outer circumferential wall of the left opening end 42*a* of the outer side shaft 36 and the respective inner circumferential walls of the first shaft insertion hole 98 and the second shaft insertion hole 100 are slightly separated away from each other. Further, the skirt portion 61 of the large cap nut 60 is slightly separated away from the left end surface of the disk-shaped member 102.

A distal end of the left end part of the rotating shaft 40 is passed through an inner hole of the first bearing 92, is passed through the first shaft insertion hole 98 and the second shaft insertion hole 100, and is exposed in a protruding manner to the exterior of the first sub-housing 18. Hereinafter, a portion of the rotating shaft 40 that protrudes from the left end of the first bearing 92 is referred to as a protruding distal end, and is designated by the reference numeral 104. On the protruding distal end 104, within the left end part 46*a* of the inner side shaft 34, there are included the first external threaded portion 48, the flange portion 50, the stopper portion 52, and the second external threaded portion 54 (see FIG. 4). On the other hand, the right end of the rotating shaft 40 is passed through the inner hole of the second bearing 94, and protrudes together with the outer stopper 71 from the insertion hole 68 that is formed in the second sub-housing 20 (see FIG. 5).

As shown in FIG. 3, the first shaft insertion hole 98 and a flow-through hole 106 formed in the inner stopper 70 communicate with an accommodation chamber 114 (to be described later) which is an internal space of the main housing 16. Therefore, the first bearing 92 and the second bearing 94 are exposed in the accommodation chamber 114. It should be noted, of course, that the second shaft insertion hole 100 communicates with the accommodation chamber 114 via the first shaft insertion hole 98.

In the present embodiment, the first bearing 92 and the second bearing 94 are so-called jet lubrication type bearings, which are lubricated and cooled by the lubricating oil that is supplied in the form of a jet flow. The type of the bearings is not particularly limited to this feature, and the bearings may be of a circulation lubrication type, or a spray lubrication type in which an oil mist is sprayed thereon. Lubricated bearings of this type are well known, and accordingly, detailed illustration and description thereof will be omitted.

The stator 32 that constitutes the rotary electric machine 12 together with the above-described rotor 30 includes an electromagnetic coil 116, and a plurality of insulating base members 118 around which the electromagnetic coil 116 is wound. Among these elements, the electromagnetic coil 116 includes three types, namely, a U-phase coil, a V-phase coil, and a W-phase coil. More specifically, in the case that the rotary electric machine 12 is used as a generator, the rotary electric machine 12 is a so-called three-phase power supply.

Moreover, the plurality of insulating base members 118 are arranged in an annular shape, whereby an inner hole is formed in the stator 32.

The stator 32 is accommodated in the accommodation chamber 114 that is formed in the main housing 16. In this instance, the second sub-housing 20 fulfills a role as a stator holder. More specifically, the insulating base members 118 that constitute the stator 32 are engaged with an annular recessed portion 122 formed in the second sub-housing 20. Due to such engagement, the stator 32 is positioned and fixed in place. Furthermore, the columnar protrusion 96 enters into the inner hole of the stator 32 from the leftward opening thereof.

Although detailed illustration thereof is omitted, inner walls of the accommodation chamber 114 and the electromagnetic coil 116 are slightly separated away from each other. Due to such separation, the main housing 16 and the electromagnetic coil 116 are electrically isolated from each other.

Moreover, by slightly separating both members away from each other, clearances are formed between the outer circumferential wall of the columnar protrusion 96 and the insulating base members 118, and between the outer walls of the permanent magnets 88 and the inner wall of the electromagnetic coil 116. As will be discussed later, these clearances become a portion of the flow passage through which the curtain air, which is a gas, flows.

As shown in FIG. 4, the first sub-housing 18 has an annular convex portion 124 that projects out in an annular shape. An inner side of the annular convex portion 124 is formed with a hollow recessed portion 126. The protruding distal end 104 constituting the left end part 46*a* of the inner side shaft 34 is inserted into the hollow recessed portion 126.

The resolver holder 26 which retains a resolver stator 130 is provided on the annular convex portion 124. The resolver holder 26 includes a flange-shaped stopper 132 that protrudes outwardly in a diametrical direction. The flange-shaped stopper 132 is set to have a greater diameter than the inner diameter of the annular convex portion 124, and accordingly, the resolver holder 26 is positioned by the flange-shaped stopper 132 coming into abutment against the annular convex portion 124. In this state, the resolver holder 26 is connected to the first sub-housing 18, for example, via a mounting bolt or the like (not shown).

On the resolver holder 26, at a boundary with the flange-shaped stopper 132, there are provided a leftward facing small cylindrical portion 134, and a rightward facing large cylindrical portion 136 having a larger diameter in comparison with the small cylindrical portion 134. A retaining hole 138 is formed in the resolver holder 26, and the resolver stator 130 is retained by a right end thereof being fitted into the retaining hole 138. When the large cylindrical portion 136 enters into the hollow recessed portion 126 together with the flange shaped stopper 132 abutting against the annular convex portion 124, the resolver rotor 56, which is retained by the flange portion 50 of the left end part 46*a* of the inner side shaft 34, is positioned in the inner hole of the resolver stator 130. These elements including the resolver stator 130 and the resolver rotor 56 constitute the resolver 140 which serves as a rotation parameter detector. According to the present embodiment, a case is exemplified in which an angle of rotation is detected by the resolver 14C.

A signal receiver connector 144 is fitted into a fitting hole 142 formed in the flange-shaped stopper 132. The resolver stator 130 and the signal receiver connector 144 are electrically connected to each other via a signal line 146. A receiver-side connector of a signal receiver (not shown), which receives signals emitted by the resolver 140, is inserted onto the signal receiver connector 144. The resolver 140 and a signal receiver are electrically connected via the signal receiver connector 144 and the receiver-side connector.

A plurality of tab portions 148 (which are omitted from illustration in FIG. 1) are provided on the small cylindrical portion 134. One of such tab portions is shown in FIG. 3.

Furthermore, the small cylindrical portion 134 is covered by the cap cover 28, which closes a leftward opening of the small cylindrical portion 134 and shields the left end part 46a of the inner side shaft 34. The cap cover 28 is connected to the tab portions 148 via connecting bolts 150.

As noted previously, the terminal casing 22 and the measuring device casing 24 are integrally provided on a side wall in close proximity to the left end of the main housing 16. Among these elements, a thermistor 152, which is a temperature measuring device, is accommodated in the measuring device casing 24. Although not illustrated in particular, measurement terminals of the thermistor 152 are drawn out from the measuring device casing 24 and are connected to the electromagnetic coil 116. From the measuring device casing 24, a harness 154 which is connected to the thermistor 152 is drawn out to the exterior.

In the terminal casing 22 which is adjacent to the measuring device casing 24, there are accommodated a U-phase terminal 156a, a V-phase terminal 156b, and a W-phase terminal 156c that are electrically connected to ends of a U-phase coil, a V-phase coil, and a W-phase coil. Stated otherwise, the terminal casing 22 is a connector for connecting an external device to which there is connected a battery 170 (refer to FIG. 7) that serves as an external power source that is electrically connected to the rotary electric machine 12, and the U-phase terminal 156a, the V-phase terminal 156b, and the W-phase terminal 156c are electric terminal portions that supply electrical power to the battery 170. Moreover, an internal space of the measuring device casing 24 and an internal space of the terminal casing 22 communicate with each other through a non-illustrated casing-to-casing communication hole.

As shown in FIG. 2, the hollow pipe members 158a to 158c, which are provided on the outer surface of the side wall of the main housing 16, are positioned externally of the cooling jacket 21 that is formed in an interior part of the side wall of the main housing 16. More specifically, the hollow pipe members 158a to 158c, for example, lie adjacent to the cooling jacket 21. In this instance, according to the present embodiment, although a case is illustrated in which three of the hollow pipe members 158a to 158c are provided, the number of the hollow pipe members depends on a required flow rate and a required flow velocity of the curtain air. More specifically, the number of the hollow pipe members is not particularly limited to three. Further, in a similar manner, the cross-sectional area of the hollow pipe members may be appropriately set according to the required flow rate and the required flow velocity of the curtain air.

In this instance, right ends of the hollow pipe members 158a to 158c individually overlap with the three downstream side communication holes 80a to 80c (see FIG. 6) that are formed in the second sub-housing 20. More specifically, the collection flow path 74 communicates with the interior parts of the hollow pipe members 158a to 158c via the upstream side communication holes 76, the relay communication passages 78, and the downstream side communication holes 80a to 80c. On the other hand, a left end of the hollow pipe member 158a communicates with a hollow interior part of the measuring device casing 24, and left ends of the hollow pipe members 158b and 158c communicate with a hollow interior part of the terminal casing 22.

The curtain air flows on an upstream side through the collection flow path 74, and flows on a downstream side through the measuring device casing 24 and the terminal casing 22. In this manner, the hollow pipe members 158a to 158c are portions of the compressed air flow passages through which the curtain air flows. Moreover, the curtain air is a portion of the compressed air that is supplied from the gas turbine engine 200.

As shown in FIG. 3, the internal space of the terminal casing 22 communicates with the accommodation chamber 114. Therefore, the curtain air that has flowed into the internal space of the terminal casing 22 is capable of flowing into the accommodation chamber 114 and coming into contact with the first bearing 92 and the second bearing 94.

Figure 7:
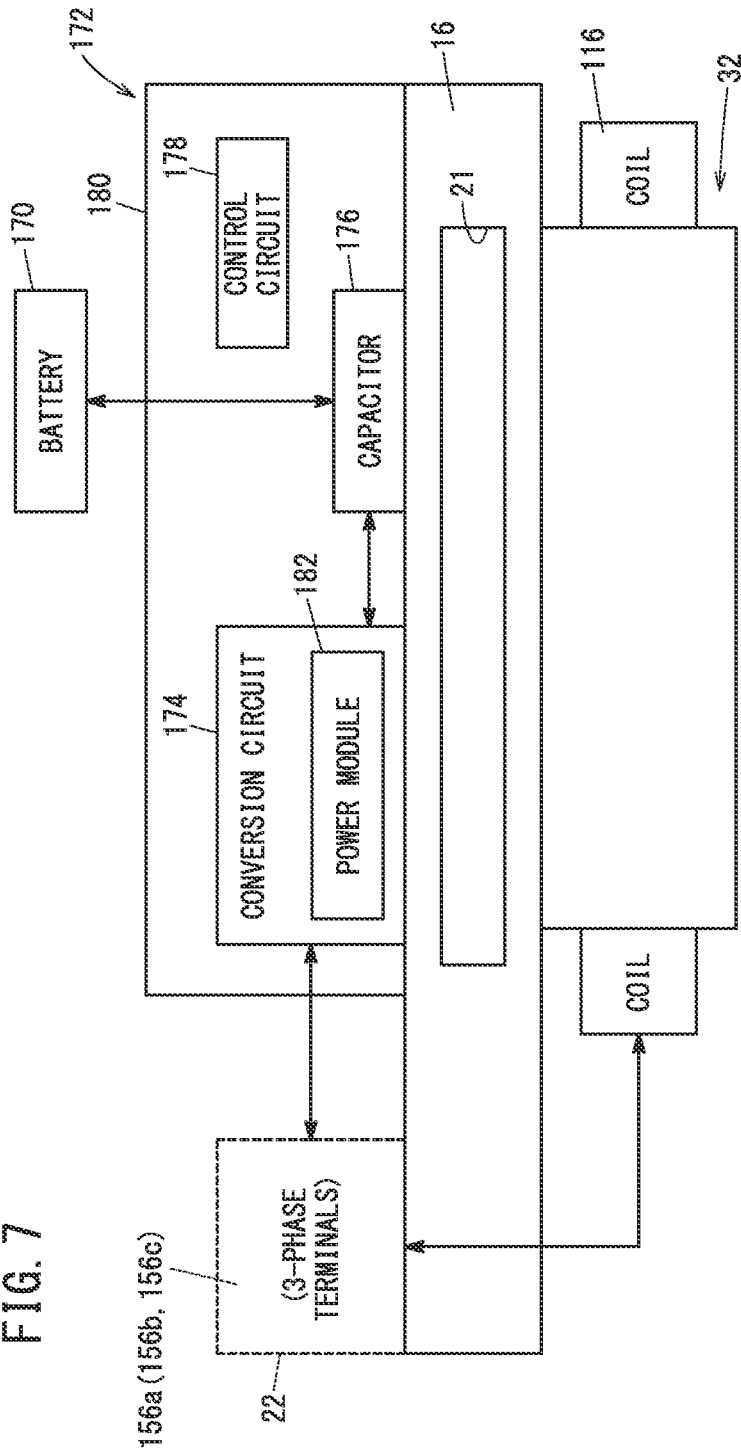
FIG. 7 is a schematic configuration diagram of an electrical current converter provided in the rotary electric machine housing.

As shown in FIGS. 1 and 2, an electrical current converter 172 is provided on an outer circumferential wall of the main housing 16 at a location closer to the gas turbine engine 200 than the terminal casing 22 is. As shown in FIG. 7, the electrical current converter 172 includes a conversion circuit 174, a capacitor 176, and a control circuit 178. The conversion circuit 174, the capacitor 176, and the control circuit 178 are accommodated inside an equipment case 180. The equipment case 180, for example, is disposed on the outer circumferential wall of the main housing 16 at a location that does not interfere with the hollow pipe members 158a to 158c (see FIG. 1).

The conversion circuit 174 is constituted to include a power module 182, which has a function of converting an alternating current generated in the electromagnetic coil 116 into a direct current. Further, the capacitor 176 temporarily stores as an electric charge the direct current converted by the conversion circuit 174. Moreover, the conversion circuit 174 also has a function of converting the direct current delivered thereto from the battery 170 into an alternating current. In this case, the capacitor 176 temporarily stores as an electric charge the direct current delivered from the battery 170 toward the electromagnetic coil 116. The control circuit 178 controls a current density of the direct current from the capacitor 176 to the battery 170, or the direct current from the battery 170 to the capacitor 176. The direct current from the battery 170 is supplied to the motor, for example, via an AC-DC converter (neither of which is shown).

As shown in FIG. 7, in this case, the equipment case 180 is positioned and fixed so as to abut against the outer circumferential wall of the main housing 16. In addition, in the equipment case 180, the conversion circuit 174 and the capacitor 176 are arranged so as to be in close proximity to the main housing 16. Since the cooling jacket 21 is provided in the main housing 16 as described above, the conversion circuit 174 and the capacitor 176 are sufficiently close to the cooling jacket 21.

Figure 8:
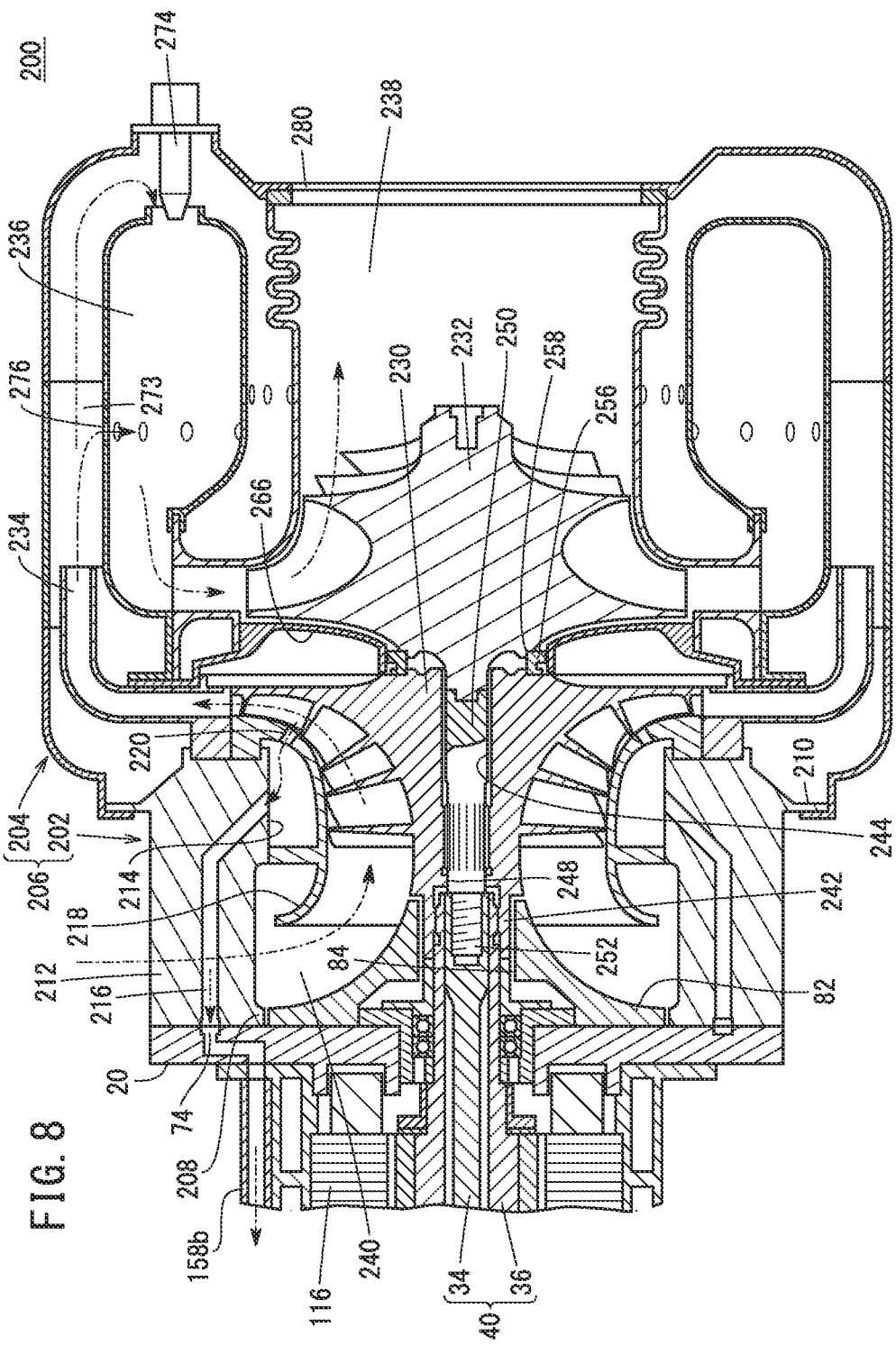
FIG. 8 is a schematic side cross-sectional view of a gas turbine engine constituting part of the combined power system.

Next, the gas turbine engine 200 will be described. As shown in FIG. 8, the gas turbine engine 200 is equipped with an engine housing 206 including an inner housing 202 connected to the second sub-housing 20 of the rotary electric machine system 10, and an outer housing 204 connected to the inner housing 202.

As shown in FIGS. 1 and 6, the inner housing 202 includes a first annular portion 208 connected to the second sub-housing 20, a second annular portion 210 having a maximal diameter, and a plurality of (for example, six) leg members 212 connecting the first annular portion 208 and the second annular portion 210. Further, a cylindrical cover member 214 protrudes from a central opening of the second annular portion 210 toward the rotary electric machine system 10. The number of the leg members 212 is appropriately set in accordance with a coupling strength required between the gas turbine engine 200 and the rotary electric machine system 10. Stated otherwise, the number of the leg members 212 is not particularly limited to six as in the illustrated example.

Right ends of the leg members 212 are connected to both the second annular portion 210 and the cylindrical cover member 214. In accordance with this feature, support rigidity (support material strength) is imparted to the leg members 212. In addition, inlet openings of air bleed passages 216 are formed at locations where the leg members 212 are connected with the cylindrical cover member 214. Further, as shown in FIG. 8, the air bleed passages 216, which communicate with air bleed ports 220 formed in a shroud case 218, are individually formed in the interior of the leg members 212 and in the interior of the first annular portion 208. Outlet openings of the air bleed passages 216 are individually formed on an end surface of the first annular portion 208 on a side facing toward the second sub-housing 20. The outlet openings overlap with the collection flow path 74. More specifically, all of the plurality of air bleed passages 216 are in communication with the collection flow path 74. In this manner, compressed air from the plurality of air bleed passages 216 flows into and is collected in the collection flow path 74.

As shown in FIG. 8, the gas turbine engine 200 is further equipped with the shroud case 218, the compressor wheel 230, the turbine wheel 232, a diffuser 234, a combustor 236, and a nozzle 238, which are accommodated in interior of the inner housing 202 and/or the outer housing 204. According to the present embodiment, the compressor wheel 230 and the turbine wheel 232 are separate members.

The shroud case 218 is a hollow body having a shape that is substantially similar to that of the rectifying member 82, and is larger in comparison with the rectifying member 82. A small diameter left end thereof faces toward the rectifying member 82, and a large diameter right end thereof is inserted into the inner housing 202. A left end of the shroud case 218 is exposed to an air intake space 240 that is formed between the leg members 212 of the inner housing 202. The top portion which is on the right end of the rectifying member 82 is inserted into the interior of the left end of the shroud case 218. Moreover, although the shroud case 218 is gradually reduced in diameter from the right end toward the left end thereof, a distal end of the left end is curved in a manner so as to expand outward in the diametrical direction.

The compressor wheel 230 is accommodated inside the shroud case 218. Stated otherwise, the shroud case 218 is disposed in surrounding relation to the compressor wheel 230. However, the compressor wheel 230 and the shroud case 218 are separated away from each other.

The compressor wheel 230 and the turbine wheel 232 are capable of rotating together integrally with the rotating shaft 40. More specifically, as shown in detail in FIG. 5, the compressor wheel 230 includes a small diameter cylindrical portion 242 (hollow cylindrical portion) at a left end thereof. The small diameter cylindrical portion 242 enters into the through hole 84 that is formed in the top portion of the rectifying member 82. On an inner wall of the small diameter cylindrical portion 242, a first outer circumferential side spline 85 (outer circumferential side engaging portion) is formed, which is made up from a plurality of teeth that extend in a diametrical inward direction and are provided annularly. The first outer circumferential side spline 85 enmeshes with the first inner circumferential side spline 66 that is formed on the outer circumferential wall of the right opening end 42b of the outer side shaft 36. Moreover, the outer side shaft 36 is press-fitted into a hollow interior part of the small diameter cylindrical portion 242. Therefore, the inner circumferential wall of the small diameter cylindrical portion 242, particularly the leftward opening, presses the outer peripheral wall of the right opening end 42b of the outer side shaft 36 inwardly. Due to being enmeshed and press-fitted in the manner described above, the compressor wheel 230 is connected to the outer side shaft 36 and hence to the rotating shaft 40.

At a diametrical center of the compressor wheel 230, a shaft hole 244 is formed that extends in the left-right direction. In such a shaft hole 244, a second outer circumferential side spline 246 (outer circumferential side tooth portion), which is made up from a plurality of teeth that extend in a diametrical inward direction and are provided annularly, is engraved on an inner wall in close proximity to the left end. Further, a hole diameter at a location where the shaft hole 244 is connected to the hollow interior part of the small diameter cylindrical portion 242 is set to be slightly smaller in comparison with other locations thereof. Therefore, an inner flange portion 248 is provided in the vicinity of an opening on the side of the small diameter cylindrical portion 242 of the shaft hole 244 of the compressor wheel 230. The hole diameter (diameter) of the shaft hole 244 is minimal at the site where the inner flange portion 248 is provided.

The output shaft 250 that is provided in the turbine wheel 232 is inserted into the shaft hole 244. The left distal end of the output shaft 250 extends to substantially the same position as the left distal end of the small diameter cylindrical portion 242 of the compressor wheel 230. As noted previously, the outer circumferential wall of the right opening end 42b of the outer side shaft 36 is inserted into the hollow interior part of the small diameter cylindrical portion 242. Therefore, the left end of the output shaft 250 that projects out from the shaft hole 244 enters into the shaft connecting hole 62 of the rotating shaft 40. A male threaded portion 252 is engraved on the left end of the output shaft 250, and the male threaded portion 252 is screw-engaged with the female threaded portion 64 formed on the inner wall of the shaft connecting hole 62. Due to such screw-engagement, the rotating shaft 40 and the output shaft 250 are connected.

A second inner circumferential side spline 254, which is an inner circumferential side tooth portion, is formed in the vicinity of the left end of the output shaft 250. The second inner circumferential side spline 254 enmeshes with the second outer circumferential side spline 246 that is formed on the inner circumferential wall of the shaft hole 244 of the compressor wheel 230. Further, a left end part of the output shaft 250 is inserted through the inner flange portion 248 by way of press fitting.

As shown in FIG. 8, a ring member 256, which is made up from a heat-resistant metal material such as a nickel based alloy or the like, is interposed between the compressor wheel 230 and the turbine wheel 232. As shown in FIG. 9, a fitting hole 258 which extends from the compressor wheel 230 toward the turbine wheel 232 is formed in the ring member 256. Further, a plurality of (for example, three) labyrinth convex portions 264 are formed on the outer peripheral wall of the ring member 256. The labyrinth convex portions 264, together with projecting in a diametrically outward direction of the ring member 256, encircle along a circumferential direction of an outer circumferential wall thereof. As will be discussed later, back-flowing of a combusted fuel (exhaust gas) generated by the combustor 236 into the compressor wheel 230 can be prevented by the labyrinth convex portions 264.

An annular protrusion 268 projects from a right end surface of the compressor wheel 230 that faces toward the turbine wheel 232. When a left end surface of the ring member 256 is seated on the right end surface of the compressor wheel 230, the annular protrusion 268 is fitted into the fitting hole 258. On the other hand, the output shaft 250 extends from a left end surface of the turbine wheel 232 that faces toward the compressor wheel 230. Further, on the left end surface, a fitting protrusion 270 that encircles the output shaft 250 in a surrounding manner is formed to project from the turbine wheel 232. When a right end surface of the ring member 256 is seated on the left end surface of the turbine wheel 232, a top surface of the fitting protrusion 270 is fitted into the fitting hole 258. In accordance with the foregoing, each of respective parts of the compressor wheel 230 and the turbine wheel 232 are fitted into the fitting hole 258. In such a state, the ring member 256 is sandwiched between both of the wheels 230 and 232.

On the other hand, in the hollow interior of the outer housing 204 (see FIG. 8), the labyrinth convex portions 264 are surrounded by an intermediate plate 266, together with being inserted inside a hole portion 272 that is formed in the intermediate plate 266. A labyrinth flow path is formed by an inner wall of the hole portion 272 and the labyrinth convex portions 264 that abut against the inner wall. The compressed air generated by the compressor wheel 230 reaches the labyrinth convex portions 264 via a back surface of the compressor wheel 230. On the other hand, a combustion gas arrives at the labyrinth convex portions 264 from a turbine wheel 232 side. Since the pressure of the compressed air is set to be higher than the pressure of the combustion gas, it is possible to prevent the combustion gas from passing through the labyrinth convex portions 264 and flowing inwardly to a compressor wheel 230 side.

As shown in FIG. 8, in a hollow interior part of the outer housing 204, portions of the shroud case 218 and the compressor wheel 230 where the diameters thereof are maximal, and the intermediate plate 266 are surrounded by the diffuser 234. Furthermore, the turbine wheel 232 is surrounded by the nozzle 238, and the nozzle 238 is surrounded by the combustor 236. An annular combustion air flow passage 273 through which combustion air flows is formed between the combustor 236 and the outer housing 204. On the other hand, a fuel supply nozzle 274 in order to supply fuel to the combustor 236 is positioned and fixed on a right end surface of the outer housing 204.

In this instance, relay holes 276 are formed in the combustor 236 for allowing the combustion air flow passage 273 to communicate with the interior of the combustor 236. Further, non-illustrated fine pores for forming an air curtain to cool the interior of the combustor 236 are formed in the combustor 236. As will be discussed later, the combustion air that is compressed by the compressor wheel 230 reaches the interior of the combustor 236 via the diffuser 234, the combustion air flow passage 273, and the relay holes 276. Furthermore, a non-illustrated delivery hole, which supplies to the turbine wheel 232 a fuel (hereinafter also referred to as a "combusted fuel," wherein the term "combusted fuel" has the same meaning as the "combustion gas" or the "exhaust gas after combustion") that is combusted together with the combustion air, is formed in the nozzle 238 at a site surrounding the largest diameter portion of the turbine wheel 232.

Further, a discharge port 280 provided with a non-illustrated discharge pipe for discharging the combusted fuel opens on a right end of the outer housing 204 and the nozzle 238. The combusted fuel passes through the delivery hole and progresses into the nozzle 238, and thereafter, the combusted fuel is expelled out of the outer housing 204 via the discharge port 280 under the action of the rotating turbine wheel 232.

The combined power system 300 according to the present embodiment is constructed basically as described above. Next, a description will be given concerning operations and advantageous effects thereof.

In the present embodiment, the rotary electric machine system 10 constitutes the combined power system 300 together with the gas turbine engine 200. Therefore, as shown in FIG. 5, the output shaft 250 is connected to the rotating shaft 40. In this instance, the shaft connecting hole 62 is formed in the right end part 46b of the inner side shaft 34 that makes up the rotating shaft 40, and the female threaded portion 64 is engraved on an inner circumferential wall of the shaft connecting hole 62. Further, the male threaded portion 252 is engraved on the left end of the output shaft 250. The left end is inserted into the shaft connecting hole 62, and the male threaded portion 252 is screw-engaged with the female threaded portion 64.

In this manner, since one end of the output shaft 250 is inserted into the shaft connecting hole 62 that is formed at one end of the rotating shaft 40, the length of the rotating shaft 40 and the output shaft 250 after being connected to each other is smaller than the total length of both of the shafts 40 and 250. Further, from the fact that the output shaft 250 is inserted into the shaft connecting hole 62 of the rotating shaft 40, the diameter of the output shaft 250 is set to be smaller than the diameter of the shaft connecting hole 62. Accordingly, the output shaft 250 is small and lightweight. Due to the above reasons, the combined power system 300 can be made both small in scale and lightweight.

In addition, connection terminals of the battery 170 (see FIG. 7), which serves as an external power source, are connected with respect to the U-phase terminal 156a, the V-phase terminal 156b, and the W-phase terminal 156c inside the terminal casing 22. In this state, a direct current is supplied from the battery 170. The conversion circuit 174 of the electrical current converter 172 shown in FIGS. 2 and 7 converts such a direct current into an alternating current, and supplies the alternating current to the electromagnetic coil 116 (the U-phase coil, the V-phase coil, and the W-phase coil) via the U-phase terminal 156a, the V-phase terminal 156b, and the W-phase terminal 156c. By the alternating current flowing through the electromagnetic coil 116, an alternating magnetic field is generated in the stator 32. Therefore, attractive forces and repulsive forces act alternately between the electromagnetic coil 116 and the permanent magnets 88 of the rotor 30. As a result, the rotating shaft 40 begins to rotate. It is a matter of course that the rotating shaft 40 may also be rotated by a widely-known type of starter (not shown).

In this instance, as shown in FIG. 5, the first inner circumferential side spline 66 is formed on the outer circumferential wall of the right opening end 42b of the outer side shaft 36 that constitutes the rotating shaft 40, and further, the first outer circumferential side spline 85 is formed on the inner wall of the small diameter cylindrical portion 242 of the compressor wheel 230. Additionally, the first inner circumferential side spline 66 and the first outer circumferential side spline 85 enmesh with each other. Furthermore, the second inner circumferential side spline 254 is formed on the output shaft 250, and the second outer circumferential side spline 246 is formed on the inner wall of the shaft hole 244 of the compressor wheel 230. Additionally, the second inner circumferential side spline 254 and the second outer circumferential side spline 246 enmesh with each other. Therefore, a rotational torque of the rotating shaft 40 is rapidly transmitted to the output shaft 250 via the compressor wheel 230.

More specifically, when the rotating shaft 40 begins to rotate, the output shaft 250 also begins rotating integrally with the rotating shaft 40. Accompanying such rotation, the compressor wheel 230 and the turbine wheel 232, which are supported by the output shaft 250, rotate together integrally with the output shaft 250. As discussed previously, by providing the first inner circumferential side spline 66 which serves as the inner circumferential side engaging portion, the first outer circumferential side spline 85 which serves as the outer circumferential side engaging portion, the second inner circumferential side spline 254 which serves as the inner circumferential side tooth portion, and the second outer circumferential side spline 246 which serves as the outer circumferential side tooth portion, and by the first inner circumferential side spline 66 and the first outer circumferential side spline 85, as well as the second inner circumferential side spline 254 and the second outer circumferential side spline 246 being mutually enmeshed (placed in engagement) with each other, the rotational torque of the rotating shaft 40 can be sufficiently transmitted to the output shaft 250.

In addition, the right end part of the rotating shaft 40 is press-fitted into the hollow interior part of the small diameter cylindrical portion 242 of the compressor wheel 230, and the left end part of the output shaft 250 is press-fitted into the inner flange portion 248 of the compressor wheel 230. Therefore, the axis of the rotating shaft 40 and the axis of the output shaft 250 accurately coincide with each other. Consequently, the output shaft 250 is sufficiently prevented from rotating in eccentric manner or while being subjected to vibrations.

In addition, as shown in FIG. 9, the ring member 256 is interposed between the compressor wheel 230 and the turbine wheel 232. The annular protrusion 268 on the right end surface of the compressor wheel 230, and the fitting protrusion 270 on the left end surface of the turbine wheel 232 are fitted respectively into the fitting hole 258 of the ring member 256. These fittings also contribute to suppressing eccentric rotation (and vibration) of the output shaft 250. Accordingly, there is no need to provide a mechanism for suppressing vibrations, or to make the output shaft 250 large in diameter. Consequently, it is possible to reduce the size and scale of the combined power system 300.

Furthermore, frictional forces are generated, respectively, between the right end surface of the compressor wheel 230 and the left end surface of the ring member 256, and between the right end surface of the ring member 256 and the left end surface of the turbine wheel 232. Owing to such frictional forces, the compressor wheel 230, the ring member 256, and the turbine wheel 232 are in close contact with each other. Accordingly, it is possible to prevent both of the wheels 230 and 232 from rotating.

Further still, when the combined power system 300 is assembled, the compressor wheel 230 and the turbine wheel 232 are aligned (centered) by the above-described fittings with respect to the output shaft 250. As can be understood from this feature, by the ring member 256 being disposed between both of the wheels 230 and 232, and the portions of both of the wheels 230 and 232 being individually fitted into the fitting hole 258 of the ring member 256, it becomes easy to center the compressor wheel 230 and the turbine wheel 232 with respect to the output shaft 250.

In addition, due to the aforementioned rotation, as shown in FIG. 8, atmospheric air is drawn into the shroud case 218 from the air intake space 240 provided between the leg members 212 of the inner housing 202. In this instance, the rectifying member 82 is located in the diametrical center of the inner housing 202. As discussed previously, the rectifying member 82 is of a chevron shape in a manner so as to be reduced in diameter toward the shroud case 218, and in addition, the side circumferential wall 83 is smooth. Therefore, the atmospheric air that is drawn in is rectified by the rectifying member 82 so as to flow toward the shroud case 218. Since the right end of the rectifying member 82 enters from the left end opening of the shroud case 218, the atmospheric air efficiently enters into the shroud case 218. In this manner, due to the fact that the rectifying member 82 is formed in the shape as described above, and the distal end thereof is made to enter into the shroud case 218, the atmospheric air can be efficiently collected in the shroud case 218.

The atmosphere air that is drawn into the shroud case 218 flows through between the compressor wheel 230 and the shroud case 218. Since the space between the compressor wheel 230 and the shroud case 218 is sufficiently narrow in comparison with the leftward opening of the shroud case 218, the atmospheric air is compressed when flowing therethrough. Stated otherwise, compressed air is generated.

The air bleed ports 220 are formed in the vicinity of the right end (base portion) of the shroud case 218. On the other hand, proximal ends of the leg members 212 of the inner housing 202 are positioned on the outer circumferential side of a substantially intermediate portion in the lateral (left-right) direction of the shroud case 218. The inlet openings of the air bleed passages 216 are formed in the proximal ends. Therefore, a portion of the compressed air is diverted from the air bleed ports 220 as the curtain air, and proceeds to the second sub-housing 20 through the air bleed passages 216 that are formed in the leg members 212. As shown in FIG. 6, the curtain air flows into the collection flow path 74 from the outlet openings of the air bleed passages 216, and is collected and spread out in an annular shape. The curtain air further passes from the collection flow path 74 through the upstream side communication holes 76, and after having been distributed into the relay communication passages 78, flows respectively from each of the three individual downstream side communication holes 80a to 80c and through the hollow interior parts of the hollow pipe members 158a to 158c shown in FIG. 1, etc.

The hollow pipe members 158a to 158c are positioned on the outer circumferential side of the cooling jacket 21. Accordingly, in the process of the curtain air flowing along the hollow pipe members 158a to 158c, the heat of the curtain air is sufficiently conducted to the cooling medium that was supplied beforehand to the cooling jacket 21. Consequently, the temperature of the curtain air becomes comparatively low. More specifically, according to the present embodiment, the temperature of the curtain air can be lowered by the cooling jacket 21 which serves in order to cool the rotary electric machine 12 and the electrical current converter 172. Therefore, in the gas turbine engine 200 or the rotary electric machine system 10, there is no need to separately provide cooling equipment in order to cool the curtain air. Consequently, by such an amount, it is possible to reduce the size and scale of the combined power system 300.

The curtain air flowing through the hollow pipe member 158a flows into the internal space of the measuring device casing 24, as shown in FIG. 2. Consequently, an air curtain is formed in the measuring device casing 24. Surplus curtain air flows into the hollow interior (internal space) of the terminal casing 22 through the casing-to-casing communication hole. An air curtain is formed inside the terminal casing 22 by such surplus curtain air, and by the curtain air that has flowed through the hollow pipe members 158b and 158c and into the internal space of the terminal casing 22.

As shown in FIG. 3, the surplus curtain air inside the terminal casing 22 flows into the accommodation chamber 114 that is formed in the main housing 16. In this instance, from the fact that the terminal casing 22 and the measuring device casing 24 are disposed on the left side of the main housing 16, the curtain air flows inwardly from the left end of the accommodation chamber 114. Thereafter, the curtain air initially enters into the inner hole of the stator 32, and more specifically, into clearances between the outer circumferential wall of the columnar protrusion 96 and the insulating base members 118.

Thereafter, a portion of the curtain air flows toward a first shaft insertion hole 98 side. Further, the remaining portion of the curtain air flows through the clearances between the outer walls of the permanent magnets 88 and the inner wall of the electromagnetic coil 116, or in other words, toward the accommodation chamber 114, and toward an insertion hole 68 side. In this manner, the curtain air branches into a portion that flows toward the first shaft insertion hole 98 at the left end (the first end part), and a portion that flows toward the insertion hole 68 at the right end (the second end part). Moreover, as can be understood from the above description, concerning the flow passage for the curtain air, the internal spaces of the terminal casing 22 and the measuring device casing 24 define an upstream side thereof, and the accommodation chamber 114 of the main housing 16 defines a downstream side thereof.

The curtain air that has flowed to the first shaft insertion hole 98 side passes through the first bearing 92 disposed inside the first shaft insertion hole 98. On the other hand, the curtain air that has flowed to the insertion hole 68 side passes through the second bearing 94 disposed inside the insertion hole 68. Thereafter, for example, both of such curtain airs in which the lubricating oil is contained pass through a lubricating discharge path, and are discharged into an oil tank (neither of which is shown), and the curtain airs are separated into the lubricating oil and the air. The lubricating oil is supplied again to the first bearing 92 and the second bearing 94. On the other hand, the air is discharged, for example, into the atmosphere.

The compressed air that has passed between the shroud case 218 and the compressor wheel 230 without entering into the air bleed ports 220 becomes the combustion air, and as shown in FIG. 8, proceeds into the diffuser 234. The combustion air flows out from an outlet hole formed in a wall portion of the diffuser 234, and into the combustion air flow passage 273 formed between the combustor 236 and the outer housing 204. The combustion air further passes through the relay holes 276 and the fine holes formed in the combustor 236, and via a clearance or the like between the combustor 236 and the fuel supply nozzle 274, the combustion air enters into a hollow interior part, and more specifically, into a combustion chamber of the combustor 236.

The combustor 236 is in a preheated state, and further, the fuel is supplied from the fuel supply nozzle 274 into the hollow interior (the combustion chamber) thereof. The fuel is combusted together with the combustion air and becomes a high temperature combusted fuel. By the combusted fuel that is supplied into the nozzle 238 from the delivery hole undergoing expansion in the nozzle 238, the turbine wheel 232 begins to rotate at a high speed. From the fact that the output shaft 250 is provided on the turbine wheel 232 together with the compressor wheel 230 being externally fitted onto the output shaft 250, accompanying the high speed rotation of the turbine wheel 232, the output shaft 250 and the compressor wheel 230 rotate integrally therewith at a high speed. Moreover, the combusted fuel is discharged to the exterior of the outer housing 204 through a non-illustrated discharge pipe provided in the discharge port 280.

The ring member 256 is interposed between the compressor wheel 230 and the turbine wheel 232, and also fulfills a role as a sealing member for sealing a space between both of the wheels 230 and 232. In addition, as shown in FIG. 9, the plurality of labyrinth convex portions 264 are formed on the outer circumferential wall of the ring member 256, and the labyrinth convex portions 264 abut against an inner wall of the hole portion 272 that is formed in the intermediate plate 266 (refer to FIG. 9). The compressed air generated by the compressor wheel 230 reaches the labyrinth convex portions 264 via a back surface of the compressor wheel 230. Further, the combustion gas arrives at the labyrinth convex portions 264 from the turbine wheel 232 side. As noted previously, the pressure of the compressed air is set to be higher than the pressure of the combustion gas. Therefore, passing of the combustion gas through the labyrinth convex portions 264 and flowing inwardly to the compressor wheel 230 side is suppressed. Due to the above reasons, a situation is avoided in which the combusted fuel, for example, enters into the shaft hole 244 from between both of the wheels 230 and 232.

As shown in FIG. 8, when the output shaft 250 begins to rotate at a high speed, supplying of the electrical current from the battery 170 (see FIG. 7) to the electromagnetic coil 116 is stopped. However, since the turbine wheel 232 is rotated at a high speed by the combusted fuel as described above, in following relation with the rotation of the turbine wheel 232 and the output shaft 250 in an integrated manner, the rotating shaft 40 also rotates integrally with the turbine wheel 232 and the output shaft 250. At this time as well, for the same reasons as described above, a sufficient rotational torque is transmitted from the output shaft 250 to the rotating shaft 40.

In addition, accompanying the rotation of the rotating shaft 40 along with the permanent magnets 88, an alternating current is generated in the surrounding electromagnetic coil 116. The alternating current is transmitted to the electrical current converter 172 shown in FIGS. 2 and 7 via the U-phase terminal 156a, the V-phase terminal 156b, and the W-phase terminal 156c. The conversion circuit 174 of the electrical current converter 172 converts such an alternating current into a direct current. When it is determined that the output of an external load (for example, a motor) that is electrically connected to the battery 170 has decreased, the control circuit 178 of the electrical current converter 172 transfers the direct current to the battery 170 through the capacitor 176 (see FIG. 7). Consequently, the battery 170 is charged.

In this process, within the electrical current converter 172, in particular, the conversion circuit 174 and the capacitor 176 become heated. However, according to the present embodiment, the equipment case 180 is positioned and fixed to the outer circumferential wall of the main housing 16, and further, the conversion circuit 174 and the capacitor 176 inside the equipment case 180 are placed in close proximity to the cooling jacket 21. Therefore, the heat of the conversion circuit 174 and the capacitor 176 is rapidly conducted to the cooling medium inside the cooling jacket 21. Consequently, a situation is avoided in which the conversion circuit 174 and the capacitor 176 become excessively high in heat.

Moreover, as shown in FIG. 3, the direction in which the output shaft 250 and the rotating shaft 40 are rotated is preferably a direction that is opposite to the direction in which the small cap nut 58, the large cap nut 60, and the male threaded portion 252 are rotated when screw-engagement thereof is carried out. This is because, in this case, a situation is avoided in which the small cap nut 58, the large cap nut 60, and the male threaded portion 252 become loosened during rotation of the rotating shaft 40. Moreover, the small cap nut 58, the large cap nut 60, and the male threaded portion 252 may be provided in advance with a mechanism for preventing loosening thereof.

In this instance, the lubricating oil is supplied in the form of a jet flow to the first bearing 92 and the second bearing 94 that rotatably support the rotating shaft 40 on the rotary electric machine housing 14. Owing to this feature, since the first bearing 92 and the second bearing 94 are cooled by the lubricating oil, seizure can be prevented from occurring in the first bearing 92 and the second bearing 94. Moreover, as noted previously, in the rotary electric machine system 10, the flow passages are formed in which the internal spaces of the terminal casing 22 and the measuring device casing 24 are provided on the upstream side, and the first bearing 92 and the second bearing 94 are provided on the downstream side. Further, a labyrinth sealing structure is provided in the flow passage, and the curtain air flows through such a labyrinth sealing structure. Therefore, it is unlikely for the lubricating oil to enter into the internal spaces of the terminal casing 22 and the measuring device casing 24.

Moreover, an air curtain made of curtain air is formed in the internal spaces of the terminal casing 22 and the measuring device casing 24. Accordingly, even if the lubricating oil enters into the internal spaces of the terminal casing 22 and the measuring device casing 24, adhering of the lubricating oil to the U-phase terminal 156a, the V-phase terminal 156b, the W-phase terminal 156c, the thermistor 152, and the like is suppressed. For the aforementioned reasons, it is possible to effectively avoid a situation in which the electric terminal portions to which the battery 170 is electrically connected, the measuring device (the thermistor 152), and the like are contaminated with lubricating oil.

In addition, in the rotary electric machine system 10, the curtain air that has passed through the first bearing 92 and the second bearing 94 flows therethrough in a manner so as to be discharged to the exterior of the rotary electric machine housing 14. Therefore, even if the lubricating oil leaks out from the first bearing 92 and the second bearing 94, the lubricating oil is accompanied by the curtain air and is discharged to the exterior of the rotary electric machine housing 14. Accordingly, it is possible to avoid a situation in which lubricating oil that has leaked out proceeds toward a rotor 30 side or remains inside the rotor 30.

Accompanying the rotation of the rotating shaft 40, the plurality of the permanent magnets 88 retained on the large diameter portion of the outer side shaft 36 rotate. Consequently, an electrical current is induced in the electromagnetic coil 116 (the U-phase coil, the V-phase coil, and the W-phase coil) that face toward the permanent magnets 88. The electrical current is taken out via the U-phase terminal 156a, the V-phase terminal 156b, and the W-phase terminal 156c as electrical power for energizing an external device.

The electromagnetic coil 116 generates heat as the electrical current flows therethrough. In this instance, the left end of the stator 32 is in contact with the curtain air prior to the curtain air branching off. Further, the curtain air, which flows along the longitudinal direction and passes through the accommodation chamber 114 toward the insertion hole 68, comes into contact with the outer wall and the inner wall of the stator 32. More specifically, a sufficient amount of the curtain air comes into contact with respect to the left end of the stator 32, and the curtain air after branching off comes into contact with the entirety of the outer wall and the inner wall.

In addition, the cooling medium flows through the cooling jacket 21 provided in the main housing 16. Due to the cooling medium, the stator 32 including the electromagnetic coil 116 is rapidly, and hence the rotary electric machine 12 is rapidly cooled by the curtain air and the cooling medium.

Further, the rotary electric machine housing 14 (the main housing 16) in which the rotary electric machine 12 is accommodated, and the terminal casing 22 in which the U-phase terminal 156a, the V-phase terminal 156b, and the W-phase terminal 156c are accommodated are separately provided. Therefore, it is unlikely for the influence of heat that is generated in the stator 32 inside the main housing 16 to be imparted to the U-phase terminal 156a, the V-phase terminal 156b, and the W-phase terminal 156c inside the terminal casing 22. Moreover, from the fact that the terminals of the battery 170 (see FIG. 7) are electrically connected thereto, the U-phase terminal 156a, the V-phase terminal 156b, and the W-phase terminal 156c also generate heat. However, the U-phase terminal 156a, the V-phase terminal 156b, and the W-phase terminal 156c are rapidly cooled by the curtain air supplied to the terminal casing 22.

In the foregoing manner, the curtain air also serves in a dual manner to cool the heat generating locations in the rotary electric machine system 10. In addition, from the fact that the electric terminal portions (the U-phase terminal 156a, the V-phase terminal 156b, and the W-phase terminal 156c), the electromagnetic coil 116, and the permanent magnets 88 and the like are cooled, it is possible to avoid the influence of heat on an output control or the like of the rotary electric machine system 10, and to avoid a situation in which excitation of the electromagnetic coil 116 and the permanent magnets 88 decreases due to heat. As a result, the reliability of the rotary electric machine system 10 is improved.

Further, from the fact that the main housing 16 in which the rotary electric machine 12 is accommodated, and the terminal casing 22 in which the U-phase terminal 156a, the V-phase terminal 156b, and the W-phase terminal 156c are accommodated are separately provided, the rotary electric machine 12 and the electric terminal portions are separated away from each other. Therefore, the U-phase terminal 156a, the V-phase terminal 156b, and the W-phase terminal 156c are not easily affected by vibrations generated accompanying rotation of the rotor 30. Stated otherwise, the U-phase terminal 156a, the V-phase terminal 156b, and the W-phase terminal 156c are protected from such vibrations. Further, as discussed previously, in the first bearing 92 and the second bearing 94, the occurrence of seizure is suppressed by the curtain air. Accordingly, the rotary electric machine system 10 is superior in terms of durability.

While the rotating shaft 40 is rotating, the angle of rotation (a rotation parameter) of the rotating shaft 40 is detected by the resolver 140. More specifically, the resolver rotor 56 which is externally fitted on the left end part 46a of the inner side shaft 34 rotates together integrally with the rotating shaft 40. Consequently, electric signals generated in the resolver stator 130 are transmitted to the signal receiver that is electrically connected to the signal receiver connector 144. The signal receiver that has read the electric signals calculates the angle of rotation of the rotating shaft 40 based on the electric signals, and transmits the result thereof to a non-illustrated control device or the like. The control device or the like obtains the RPM by way of a calculation based on the angle of rotation.

The resolver 140 is disposed on the protruding distal end 104 of the rotating shaft 40 that is exposed from the rotary electric machine housing 14. Accordingly, it is unlikely for the influence of heat generated in the electromagnetic coil 116 of the stator 32 inside the rotary electric machine housing 14, and the influence of vibrations generated accompanying rotation of the rotor 30 to be imparted to the resolver 140. In addition, the first bearing 92 and the second bearing 94 that support the rotating shaft 40 are provided inside the rotary electric machine housing 14. Accordingly, vibrations of the first bearing 92 and the second bearing 94 are suppressed by the rotary electric machine housing 14. This feature as well also makes it unlikely for the influence of vibrations to reach the resolver 140.

In the foregoing manner, by suppressing the transfer of heat and vibrations, the detection result of the rotation angle by the resolver 140 becomes accurate. Further, the useful lifetime of the resolver 140 is also lengthened.

For example, in the case that the resolver 140 is replaced with one having a larger inner diameter and outer diameter, the inner side shaft 34 may be replaced with one having a larger diameter on the left end part 46a thereof. Moreover, in the case that a single solid rotating shaft is adopted as the rotating shaft 40, in the case that such a solid rotating shaft is replaced with a large diameter one in order to correspond to the replacement of the resolver 140 with one having a large inner diameter and outer diameter, it may be difficult for such a solid rotating shaft to pass through the first bearing 92 or the second bearing 94. As can be understood from this situation, the rotating shaft 40 of the present invention is constituted by the outer side shaft 36 and the inner side shaft 34, together with the outer side shaft 36 being passed through the first bearing 92 and the second bearing 94. Further, the resolver rotor 56 is disposed on the portion of the inner side shaft 34 that is exposed from the outer side shaft 36. Thus, by replacing the inner side shaft 34, it becomes possible to cope with resolvers 140 having various inner diameters and outer diameters.

The present invention is not particularly limited to the above-described embodiment, and various modifications can be adopted therein without departing from the essence and gist of the present invention.

For example, according to the present embodiment, the resolver 140 is adopted as the rotation parameter detector, however, it is also possible for a detector including a Hall element to be adopted.

Further, after the curtain air has been made to flow through the internal space of the measuring device casing 24, the curtain air may be allowed to flow through the internal space of the terminal casing 22. Alternatively, the curtain air may be supplied separately to the measuring device casing 24 and the terminal casing 22, and the curtain air that has flowed through the internal spaces of the casings 22 and 24 may be distributed in a separate manner to the accommodation chamber 114.

Furthermore, in the gas turbine engine 200, the compressor wheel 230 and the turbine wheel 232 may be arranged in a reverse direction to that shown in FIG. 8. More specifically, the positions thereof may be exchanged with each other. In this case, the shaft hole 244 may be formed in the turbine wheel 232, and the output shaft 250 may be provided in the compressor wheel 230. Apart therefrom, the types of the compressor wheel 230 and the turbine wheel 232 may be of a centrifugal type or an axial flow type. If the compressor wheel 230 and the turbine wheel 232 are arranged coaxially, a combination of a multi-stage compressor wheel and a multi-stage turbine wheel may be used in which the centrifugal type and the axial flow type are combined.

Further still, as shown in FIG. 3, the rotary electric machine 12 constituting the rotary electric machine system 10 may be a motor in which the rotating shaft 40 is rotated by supplying electrical current to the electromagnetic coil 116. In this case, the U-phase terminal 156a, the V-phase terminal 156b, and the W-phase terminal 156c are electric terminal portions that receive electrical power from the battery 170.

The electrical current converter may include a circuit for lowering or raising the voltage of an alternating current or a direct current.

Further, although in the above-described embodiment, an embodiment is illustrated in which the gas turbine engine 200 is used as a gas supply source by partially diverting the compressed air generated by the gas turbine engine 200, as shown in FIG. 2, it is also possible to use an externally provided pump 290 as a gas supply source. In this case, the atmospheric air or the like may be compressed under the action of the pump 290, and may be supplied to the hollow pipe members 158a to 158c or the collection flow path 74. Moreover, in such a configuration, it is not particularly necessary to divert the compressed air from the gas turbine engine 200.

In addition, the configuration for transmitting torque between the rotating shaft 40 and the output shaft 250 is not particularly limited to the meshing of splines. For example, one or more convex portions may be provided on an outer circumferential wall of the rotating shaft 40 so as to project outwardly in a diametrical direction, whereas one or more recessed portions may be formed on the output shaft 250, and the convex portions and the recessed portions may be engaged with each other. Alternatively, the rotating shaft 40 may have a polygonal shape, whereas a polygonal hole may be formed in the output shaft 250, and the rotating shaft 40 may be engaged with such a polygonal hole. In the latter of such elements, the outer circumferential wall of the rotating shaft 40 becomes the inner circumferential side engaging portion, and the inner circumferential wall of the polygonal hole becomes the annular outer circumferential side engaging portion.

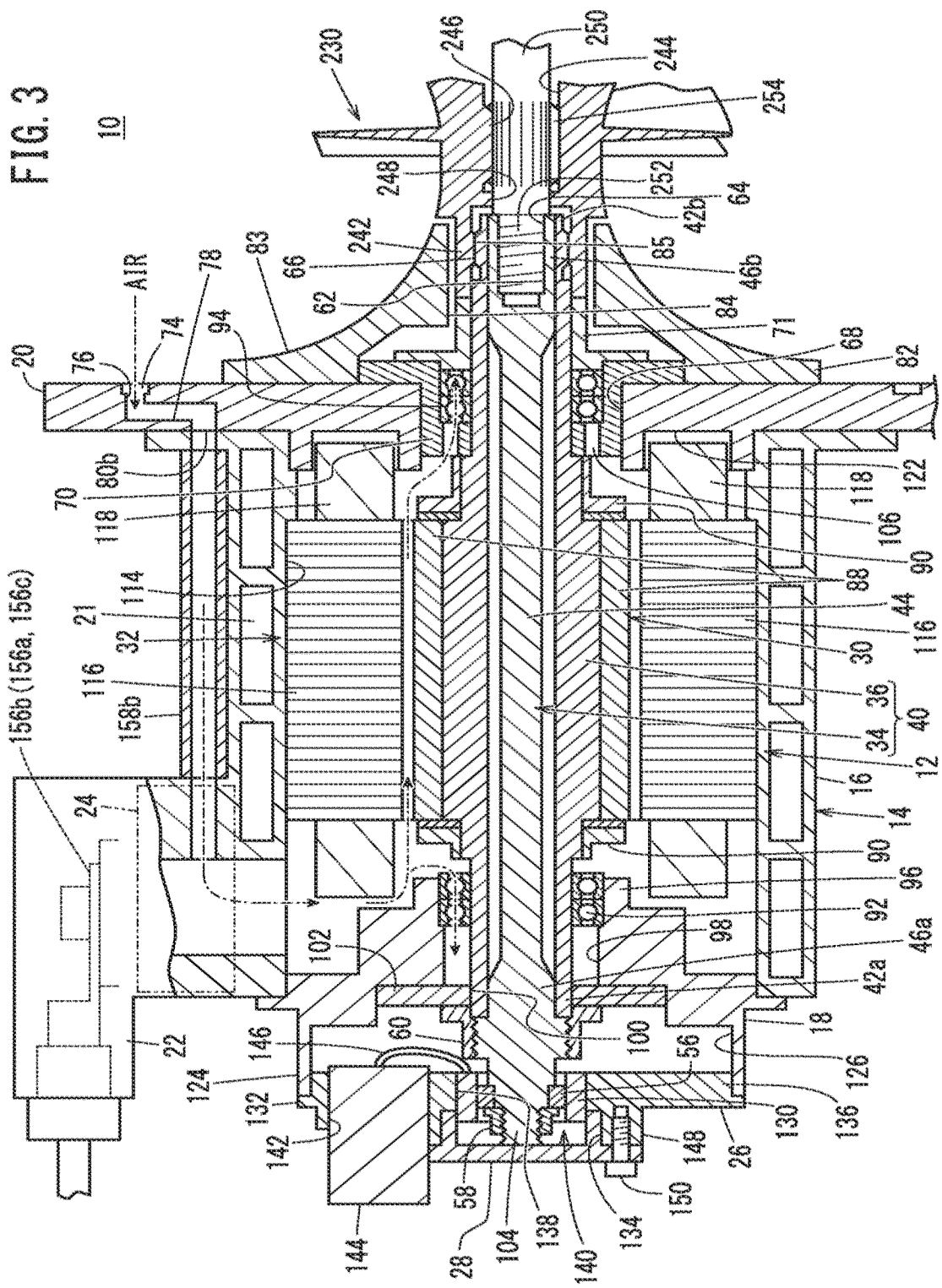

What is claimed is:

1. A combined power system comprising:
    a rotary electric machine system including a rotary electric machine, and a rotary electric machine housing in which a rotating shaft of the rotary electric machine is rotatably supported; and
    a gas turbine engine including an output shaft configured to support a turbine wheel and a compressor wheel and rotate integrally with the rotating shaft, and an engine housing in which the turbine wheel and the compressor wheel are accommodated,
    wherein the engine housing includes a plurality of leg members on one end thereof in an axial direction, the plurality of leg members are connected to one end of the rotary electric machine housing in an axial direction, and an air intake space is formed between the plurality of leg members,
    the combined power system further comprises:

a rectifying member provided on the one end of the rotary electric machine housing in the axial direction, and disposed in the air intake space, the rectifying member being gradually reduced in diameter from the rotary electric machine toward the gas turbine engine; and a shroud case supported by the engine housing and disposed in the air intake space, the shroud case facing toward the rectifying member, and the rectifying member includes a distal end facing toward the shroud case, and the distal end is inserted inside the shroud case.

2. The combined power system according to claim 1, wherein an outer wall of the rectifying member is a smooth surface.

3. The combined power system according to claim 1, wherein one end of the output shaft in an axial direction is connected to one end of the rotating shaft in an axial direction, and a location where the rotating shaft and the output shaft are connected to each other is inside the rectifying member.

4. The combined power system according to claim 1, wherein one end of the rotating shaft in an axial direction is inserted into one end of the compressor wheel in an axial direction, and the one end of the compressor wheel in the axial direction is inserted into the rectifying member.

* * * * *

UNITED STATES PATENT AND TRADEMARK OFFICE
CERTIFICATE OF CORRECTION

PATENT NO. : 11,634,997 B2
APPLICATION NO. : 17/708034
DATED : April 25, 2023
INVENTOR(S) : Yazaki et al.

It is certified that error appears in the above-identified patent and that said Letters Patent is hereby corrected as shown below:

In the Drawings

In FIG. 3:
The Japanese Word "IY" is erroneously included in FIG. 3. Please replace FIG. 3 with attached replacement drawing.

Signed and Sealed this
Thirteenth Day of June, 2023

Katherine Kelly Vidal
*Director of the United States Patent and Trademark Office*